(12) United States Patent
Tomita et al.

(10) Patent No.: US 6,543,066 B2
(45) Date of Patent: Apr. 8, 2003

(54) WASHING WATER SUPPLY APPARATUS

(75) Inventors: Katsunori Tomita, Aichi (JP); Kenichi Ito, Aichi (JP); Shigeru Ozawa, Nagano (JP)

(73) Assignees: Inax Corporation, Aichi (JP); Kabushiki Kaisha Sankyo Seiki Seisakusho, Nagano (JP)

(*) Notice: Subject to any disclaimer, the term of this patent is extended or adjusted under 35 U.S.C. 154(b) by 0 days.

(21) Appl. No.: 09/946,465

(22) Filed: Sep. 6, 2001

(65) Prior Publication Data
US 2002/0026666 A1 Mar. 7, 2002

(30) Foreign Application Priority Data
Sep. 6, 2000 (JP) ......................................... 2000-269733

(51) Int. Cl.$^7$ ................................................. E03D 5/10
(52) U.S. Cl. .................... 4/249; 4/DIG. 3; 137/624.12; 137/624.18
(58) Field of Search ........................ 4/249, 422, DIG. 3; 137/624.11, 624.12, 624.22, 624.18; 251/262, 263

(56) References Cited

U.S. PATENT DOCUMENTS

| 2,282,604 | A | * | 5/1942 | Ingraham ............ 137/624.11 X |
| 2,552,625 | A | * | 5/1951 | Filliung, Jr. ............... 4/DIG. 3 |
| 3,908,204 | A | * | 9/1975 | Hopkins ..................... 4/249 X |
| 4,003,402 | A | * | 1/1977 | Corliss et al. .......... 137/624.18 |
| 4,570,272 | A | * | 2/1986 | Kawaguchi et al. ....... 4/DIG. 3 |
| 5,309,942 | A | * | 5/1994 | Orii et al. ............ 137/624.11 X |

FOREIGN PATENT DOCUMENTS

| JP | 2-35131 | 2/1990 |
| JP | 3-90742 | 4/1991 |

* cited by examiner

Primary Examiner—Robert M. Fetsuga
(74) Attorney, Agent, or Firm—Sughrue Mion, PLLC

(57) ABSTRACT

A washing water supply apparatus 1 for supplying washing water to a toilet has valve members A and B opening/closing an opening leading to the toilet from a washing water source, cam members 8 and 9 opening/closing the valve members A and B directly, and a driving source 2 driving the cam members 8 and 9 rotatably. By opening/closing the above-mentioned opening of each of valve members A and B gradually corresponding to cam face shapes of the cam members 8 and 9, generation of water hammer phenomenon is prevented.

7 Claims, 6 Drawing Sheets

WASHING WATER SUPPLY APPARATUS

BACKGROUND OF INVENTION

1. Filed of the invention

The present invention relates to a washing water supply apparatus for flowing washing water into a toilet bowl.

2. Related Art

Conventionally, various kinds of automatic washing water supply apparatus automatically flowing washing water into a toilet bowl by opening/closing a valve mechanism arranged at a toilet tank or the like using driving force of a motor are suggested (Unexamined Japanese Patent Publications Hei. 2-35131, Hei. 3-90742 or the like). The above-mentioned valve mechanisms are usually constructed by an electromagnetic valve. The electromagnetic valve is constructed so that the valve is opened or closed by applying the predetermined voltage.

As described above, in a conventional automatic washing water supply apparatus, a valve mechanism is constructed by an electromagnetic valve. Thus, the valve can select only any of states of full opening or complete closing so that fine opening states such as an intermediate opening state (half open) and etc. can not be operated. Additionally, the valve is closed in an instant by electric power at switching the full opening or complete closing. Therefore, washing water going forward with large force to the valve suddenly and full closed collides with the valve strongly and flows backward so as to generate a shock wave, so-called water hammer phenomenon. Thus, strong shock generates at a valve, a pipe where washing water flows through, and another part, so that the shock becomes a large load and causes damage.

SUMMARY OF INVENTION

In a view of the above-mentioned problems, an object of the invention is to provide a washing water supply apparatus in which damage of a valve, a pipe, and the like by so-called water hammer phenomenon does not occur and safety is superior.

To achieve the object, there is provided a washing water supply apparatus for supplying washing water to a toilet bowl comprising a valve member opening/closing an opening leading to said toilet from a washing water source, a cam member opening/closing the valve member directly and a driving source driving the cam member rotatably.

Since the valve members opening/closing the opening are directly operated by rotation drive of the cam, degree of opening of the valve member can be suitably controlled. Further, since change to closing from opening is gradually carried out not in an instant such as the conventional electromagnetic valve system, so-called water hammer phenomenon does not occur so that damage of the valve member, the pipe, and etc. is hard to occur.

According to another aspect of the present invention, there is rotation drive speed of the cam member is changeable responding to the operation state in the above-mentioned washing water apparatus.

Additionally, according to another aspect of the present invention, rotation drive speed of said cam member at operating said valve member to opening from closing is low and rotation drive speed of the cam member at operating the valve member to closing from opening is high. Because of that, rotation drive speed of the cam member can be varied at a case when large torque is required to operate the valve member (for example, operation from closing to opening) and a case when such the large torque is not need (for example, operation from opening to closing). Concretely, when the large torque is not required, rotation drive speed can be made high. Therefore, it is possible to shorten rotation drive time of the cam member so as to shorten the entire operation time of the cam member and to shorten one cycle operation washing the toilet.

According to another aspect of the present invention, plural opening/closing modes responding to rotation angle of the cam member and a normal mode keeping state where the opening always opens in these opening/closing modes, wherein the cam member is driven rotatably to both directions and can come and go between another each opening/closing mode without through the normal mode. Thus, by providing the normal mode, freezing of water pipe and the like at the coldest period can be prevented. Since the cam member can come and go between another opening/closing modes without through the normal mode at usual use, needless operation does not occur so as to operate efficiently.

According to another aspect of the present invention, a plural of the openings are provided, the valve members are provided so as to corresponding to these openings each, plural opening/closing modes of these plural valve members are formed, and rotation drive speed of the cam members in each opening/closing mode section are different at least in a part of the modes in the above-mentioned washing water supply apparatus. Because of that, plural flows of water for washing are formed so as to improve washing force. Moreover, since various opening/closing conditions of the plural valve members are combined and operation speed between each of these modes can be changeable, it is possible to shorten operation time of one cycle as a whole by making operation speed high while drive torque of the cam member is small.

According to another aspect of the present invention, plural cam members different in cam face shape responding to the plural valve members are provided, and when rotation load applying to at least one cam member among these cam members is large, cam face shapes of the plural cam members are arranged so that rotation load applying to at least one of the other cam member is small in the above-mentioned washing water supply apparatus. Because of that, a section making drive torque of the cam member the maximum can be removed so as to make one cycle operation smooth and sure.

According to another aspect of the present invention, the cam face shape of the cam member operating the each valve member opening/closing the each opening is constructed so that the plural openings do not open at the same time in the above-mentioned washing water supply apparatus. Thus, by making plural openings open by switching step by step not by opening the plural openings at the same time, it is prevented to making great quantity of washing water flow at an instance through the toilet so as to save water.

DETAILED DESCRIPTION OF PREFERRED EMBODIMENTS

A washing water supply apparatus of a mode for carrying out according to the invention will be described below referring FIG. 1 to FIG. 7. The washing water supply apparatus described below equips two valve members, provided at an inlet pipe or a low tank (called wash water source hereinafter),operated by two cam members, respectively, in use of a driving force of a motor to supply washing water from a washing water source to a toilet bowl so as to wash the toilet bowl. However, the cam members and the valve members are not limited to two, so that they may be one each, or three or more. Additionally, providing two or more valve members, with fewer cam members for opening/ closing these valve members, may be used as a cam member and a valve member.

Figure 1:
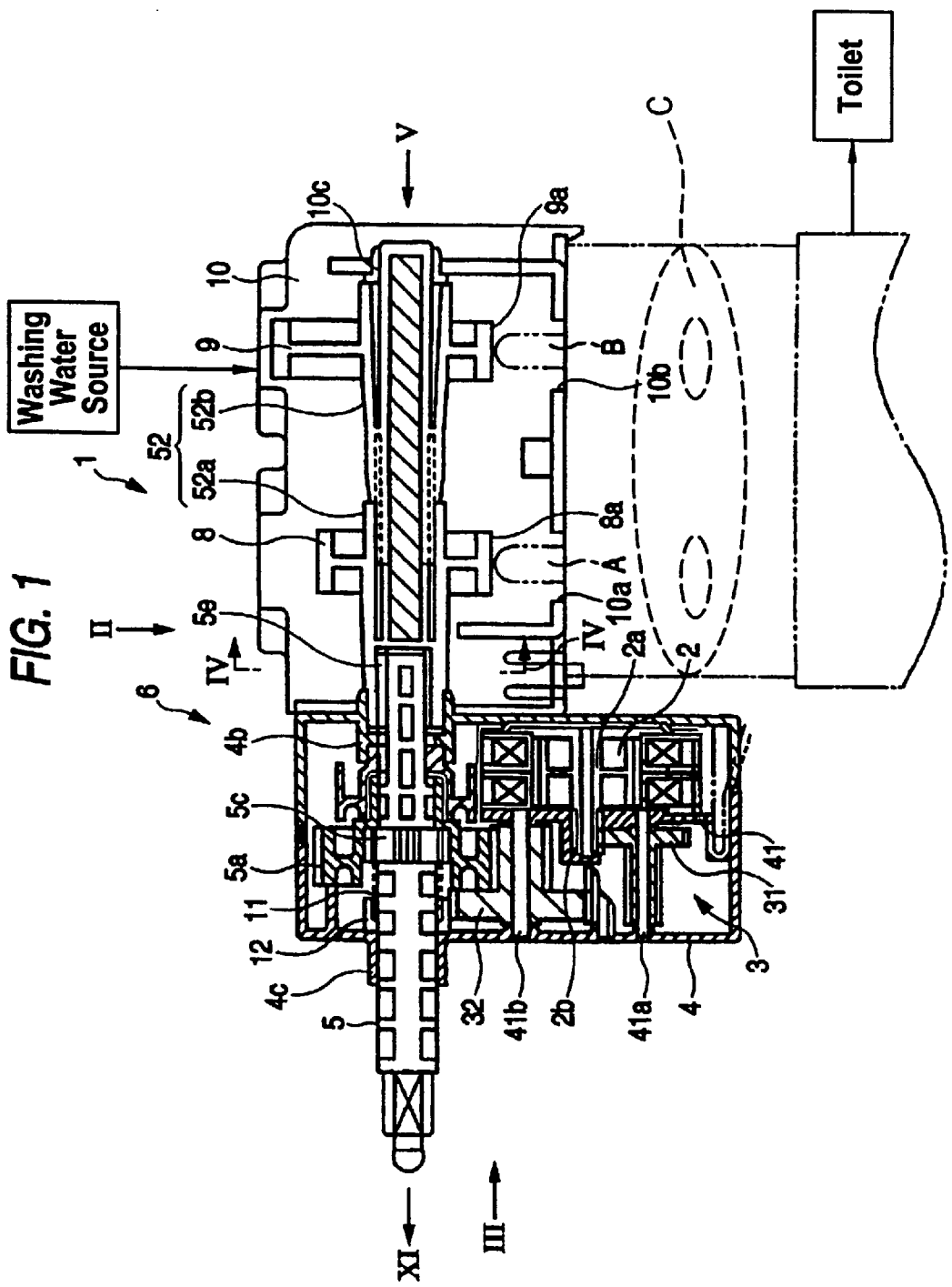
FIG. 1 is a longitudinal sectional view showing an inside mechanism of a washing water supply apparatus according to a mode for carrying out of the invention.
Figure 2:
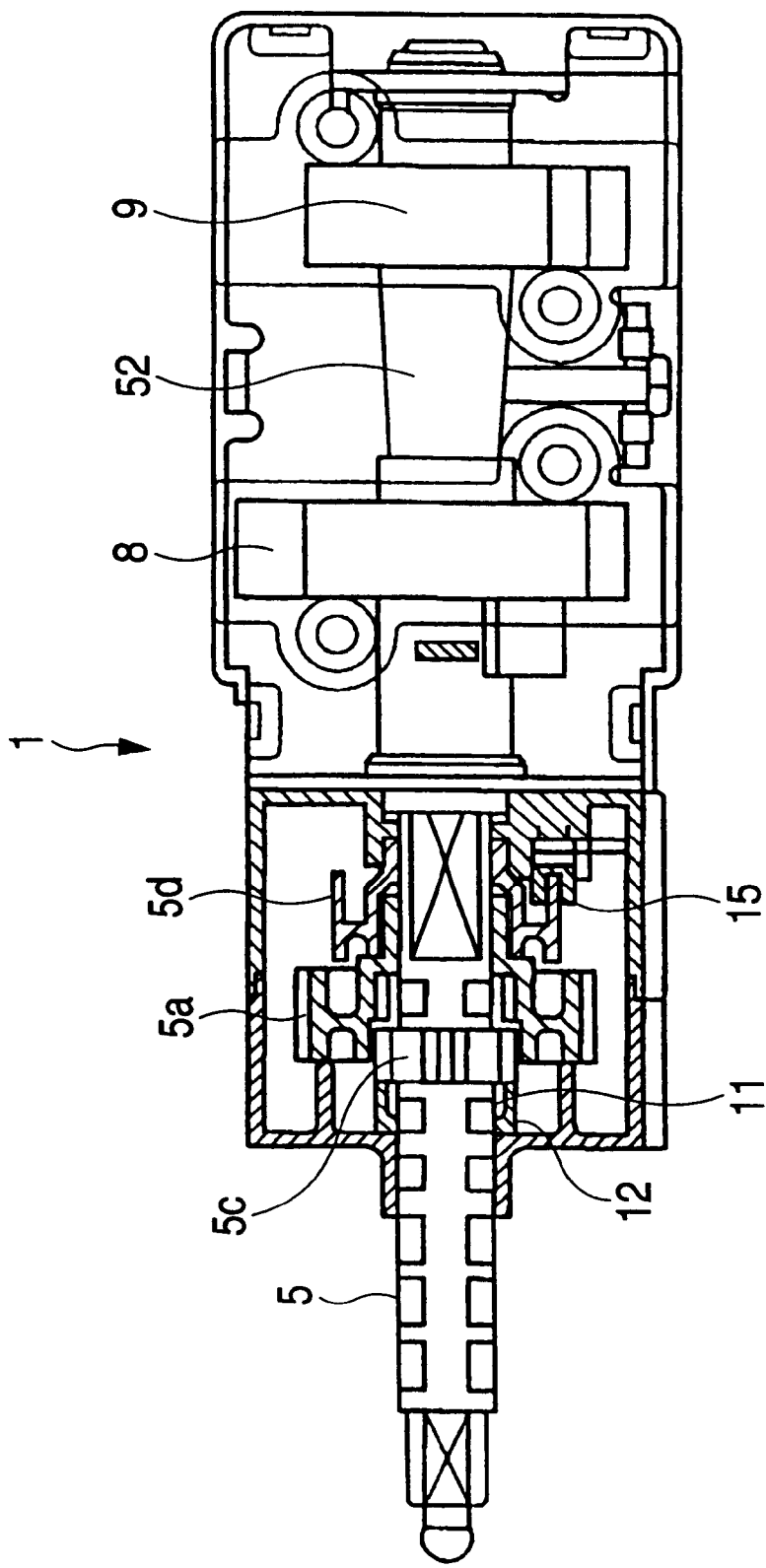
FIG. 2 is a sectional view looking at the inside mechanism of the washing water supply apparatus of FIG. 1 from II shown with an arrow.
Figure 3:
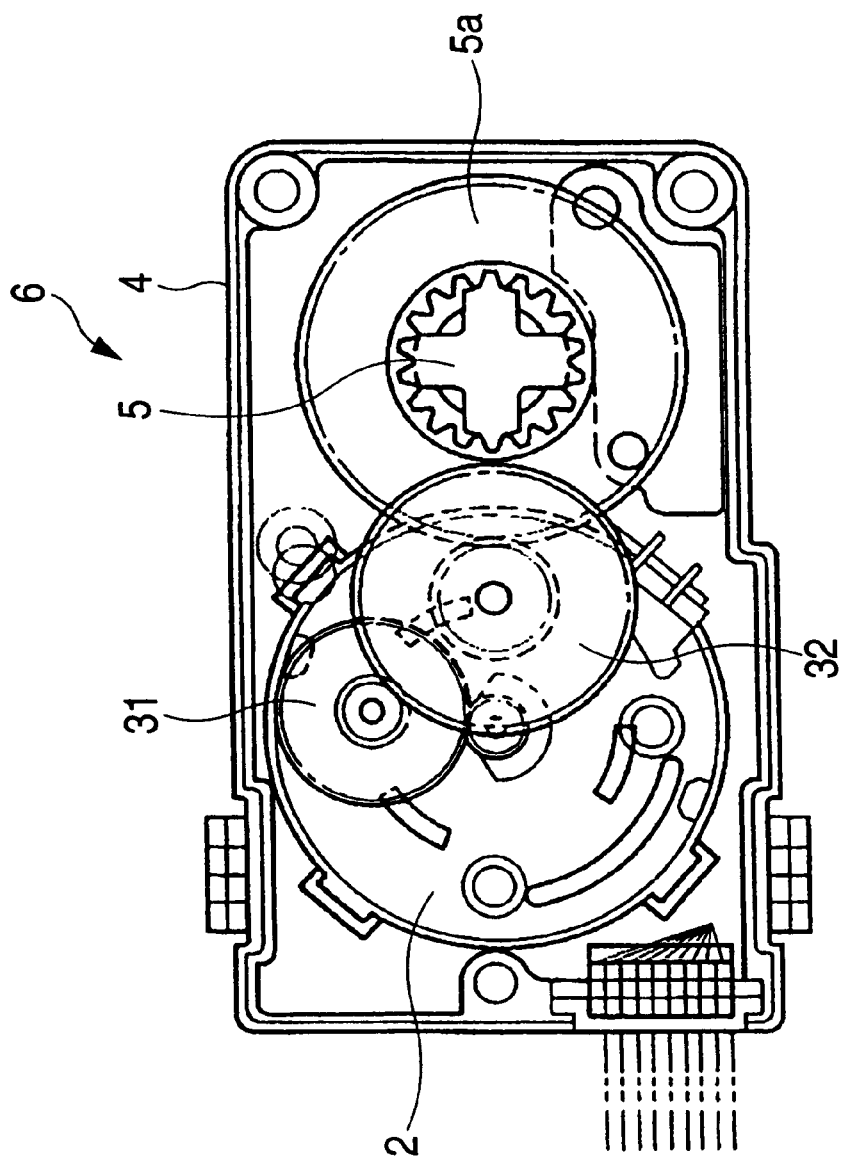
FIG. 3 is a side view showing a state looking at the drive mechanism portion of the washing water supply apparatus of FIG. 1 taking off a part of a case from III shown with an arrow.

As shown in FIG. 1, FIG. 2, and FIG. 3, a washing water supply apparatus 1 has two cam members 8 and 9 directly opening/closing each two valve members A and B opening/ closing two openings (shown generally at C) leading from a washing water source to a toilet, and a driving mechanism portion 6 driving these cam members 8 and 9 rotationally.

The driving mechanism portion 6 is constructed by a case 4, a motor 2 arranged in the case 4, a reduction gear train, and an operation shaft 5 supported by the case rotationally. In the case 4, other than the above-mentioned motor 2 being driving source of the cam members 8 and 9, an intermediate base plate 41, an output gear 5a inserted in circumference of the operation shaft 5, a part of the operation shaft 5, and a photo interrupter 15 (See FIG. 2) for detecting a rotation angle position of the output gear 5a and the operation shaft 5 are arranged.

The motor 2 is constructed by a stepping motor capable of rotating to two directions, and is arranged at a bottom side of FIG. 1 in the case 4 divided two to shaft direction. An output shaft 2a of the motor 2 is arranged so as to project passing through the intermediate base plate 41 being the motor 2 put in the case 4. To a pinion 2b formed at tip part of the output shaft 2a of the motor 2, a first gear 31 serving as the first stage of the reduction gear train 3 is meshed.

The reduction gear train 3 is transferring means transferring driving force of the motor 2 to the operation shaft 5, and is constructed by the first gear 31, a second gear 32, and the output gear 5a being the last stage. The first gear 31 and the second gear 32 are supported rotationally by shafts 41a and 41b supported at both ends thereof by the intermediate base plate 41 and the case 4 each.

In this construction, the reduction gear train 3 transfers driving force of the motor 2 to the output gear 5a provided at circumference of the operation shaft 5 through the first gear 31 and the second gear 32. When the operation shaft 5 and the output gear 5a are in a state capable of rotating integratedly, the operation shaft 5 and a driving shaft 52 connected to the operation shaft 5 rotate receiving the rotation transfer.

The operation shaft 5 can rotate by driving force of the motor 2 put in the case 4 or manual, and is inserted into the case 4 so that both ends thereof project to outside of the case 4. To a part projected from the case 4 at one end of the operation shaft 5, an operation knob for manual (not shown) is attached integratedly. One end of the drive shaft 52 having the first and second cams 8 and 9 is inserted into the other end of the operation shaft 5.

The output gear 5a has a hollow portion inside, and an engaging portion with an engaging member 5c provided at the operation shaft 5 is provided at inner circumference portion of the part where the follow portion is formed. A compression spring 11 pushing whole of the operation shaft 5 to the driving shaft 52 side by pushing the engaging member 5c to the driving shaft 52 side is inserted Between side end face of the engaging member 5c provided at outer circumference of the operation shaft 5 and a spring stopper portion 12 formed at inside wall of the case 4. Under this construction, the operation shaft 5 is pushed to the driving shaft 52 side by pushing force of the energetic spring 11 so that the engaging member 5c is inserted into the output gear 5a. When the operation shaft 5 is pulled to X1 direction shown with an arrow in FIGS. 1 and 2, the engaging member 5c escapes from inner circumference of the output gear 5a while compressing the compression spring 11. Thus, the operation shaft 5 is set free from engagement with the output gear 5, and connection with the motor 2 through the reduction gear train 3 comes off so as to be free. As the result, the operation shaft 5 becomes free to the motor 2 so that light operation by manual becomes possible.

Although the operation shaft 5 is pulled out to X1 direction shown with an arrow in FIGS. 1 and 2 while an end face of the engaging member 5c contacts the spring stopper 12 when the operation shaft 5 is pulled as above-mentioned, the operation shaft 5 is not pulled out more. Thus, although the drive shaft 52 is connected to a top portion of the operation shaft 5 so as to be movable relatively to thrust direction to the operation shaft 5 in FIGS. 1 and 2, the both do not escape. That is, thrust moving quantity of the operation shaft 5 is limited as above-mentioned.

A position detecting rotation member 5d serving as a part of position detecting means is inserted into a circumference of the operation shaft 5. One end face of the position detecting rotation member 5d contacts one end face of the output gear 5a, the other end face thereof contacts a projecting portion formed at an inner wall of the case 4, and the both contacts determines a position to the shaft direction in the case 4. The position detecting rotation member 5d is rotatable with the operation shaft 5 integrally, has a roughly cylindrical shaped portion where slits (not shown) are arranged at every roughly predetermined angle, and the cylindrical shaped portion is arranged between transmitting/ receiving light portions of a photo interrupter 15 (See FIG. 2). Thus, the rotation angle of the operation shaft 5 could be detected by using the photo interrupter 15 and the slits provided with every predetermined angle on the position detecting rotation member 5d which integrally rotates with the operation shaft 5.

Figure 4:
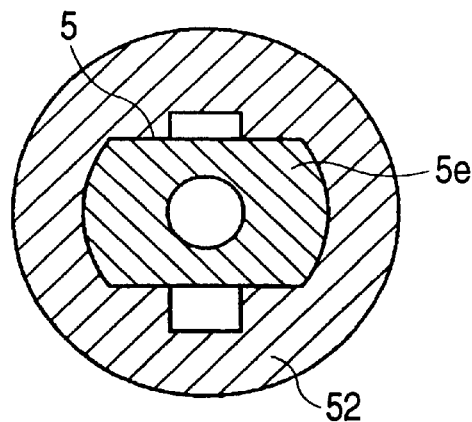
FIG. 4 is a sectional view cut by IV—IV line of FIG. 1.

At the top end portion of the operation shaft 5 in FIGS. 1 and 2, an engaging section portion 5e of an oval shape in section is formed as shown in FIG. 4. One end of the drive shaft 52 is inserted into the engaging section portion 5e. An inner circumference face of the drive shaft 52 is constructed like an oval shape in section similarly as the outer circumference face of the operation shaft 5, thereby the both engage so as to be integrated only to a circumference direction.

The case 4 has supporting cylinder portions 4b and 4c supporting the above-mentioned operation shaft 5 rotationally on the same axis. One of them, the supporting cylinder portions 4b is inserted into a fitting hole of a case for cam member storing 10 arranged adjacently to the case 4.

In the case for cam member storing 10, the drive shaft 52 rotates integrally with the operation shaft 5 in such a manner that one end of the drive shaft 52 is connected to the operation shaft 5. That is, the drive shaft 52 is inserted into the operation shaft 5 at one end thereof, outer circumference portion thereof is rotatably supported by the above-mentioned supporting cylinder portion 4b, and the other end is supported by a bearing portion 10c formed in the case for cam member storing 10.

Figure 5:
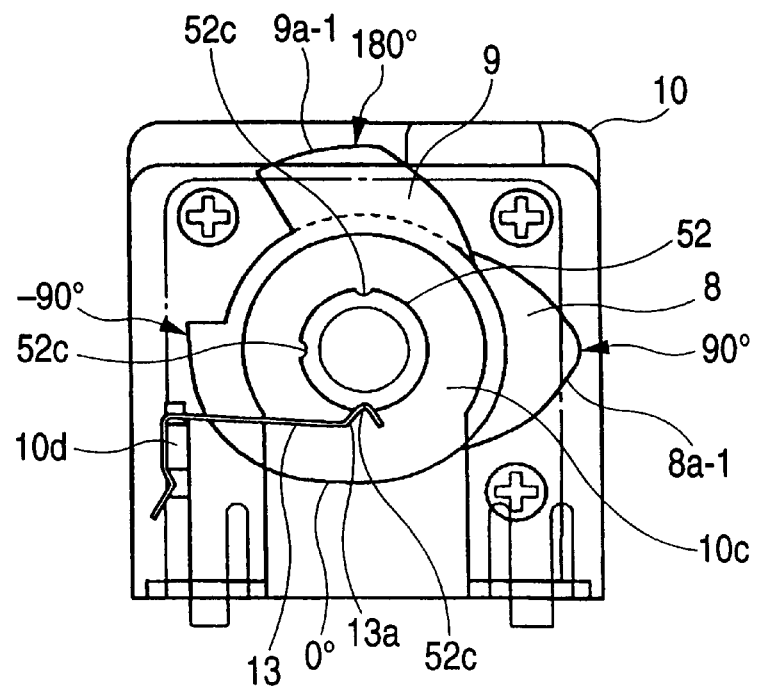
FIG. 5 is a perspective view looking at the washing water supply apparatus of FIG. 1 from V shown with an arrow.
Figure 6:
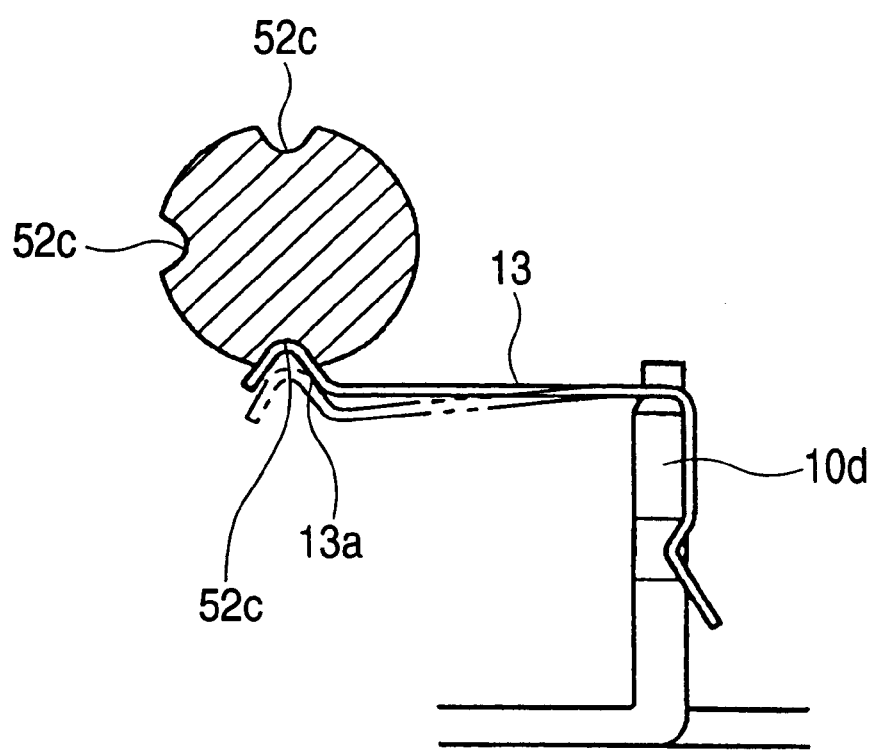
FIG. 6 is a view describing a groove for generating a crick feeling of the washing water supply apparatus of FIG. 5. This is a sectional view looking at the part thereof from rear side of FIG. 5.

As shown in FIGS. 5 and 6, three grooves 52c for generating a crick feeling are formed with every 90 degrees at outer circumference face of the driving shaft 52. One end of a spring 13 for generating a crick feeling is fixed at a spring stopper portion 10d provided in the case for cam member storing 10. A mountain portion 13a formed at the other end of the spring 13 for generating a crick feeling is fallen into these grooves 52c. Specifically, the other side of the spring 13 is pushed so as to contact outer circumference face of the drive shaft 52, and the above-mentioned mountain portion 13a is fallen into each groove 52c every time when the drive shaft 52 is set at the predetermined rotation position of every 90 degrees. Thus, when the operation shaft 5 and the drive shaft 52 rotate to the predetermined angle, the mountain portion 13a of the spring 13 is fallen into the groove 52c so as to generate a crick feeling. The construction is provided to recognize position of rotation of the operation shaft 5 at rotation of the operation shaft 5 by manual to the operator.

The drive shaft 52 is constructed by a first member 52a inserted into the operation shaft 52 and a second member 52b fit into the first member 52a by press fitting. A first cam member 8 is formed integrally at outer circumference of the first member 52a, and a second cam member 9 is formed integrally at outer circumference of the second member 52b. Thus, both cam members 8 and 9 rotate integrally with the operation shaft 5 and the driving shaft 52.

As shown in FIG. 1, a tip portion of the valve member A opening/closing a first one of the openings C faces through a hole 10a formed at the case for cam member storing 10 at position capable of contacting a cam face 8a of the first cam member 8 in the case for cam member storing 10. Similarly, a tip portion of the valve member B opening/closing a second one of the openings faces through a hole 10b formed at the case for cam member storing 10 at position capable of contacting a cam face 9a of the second cam member 9 in the case for cam member storing 10.

When the operation shaft 5 and the drive shaft 52 are rotated by motor drive or manual in the washing water supply apparatus 1, the first and the second cam members 8 and 9 are rotated by the rotation of the operation shaft 5 and the drive shaft 52, respectively. Thus, the valve members A and B contacting the cam faces 8a and 9a of the first and the second cam members 8 and 9 control opening/closing state acting with the shape of the cam faces 8a and 9a so as to control the quantity of washing water flowing from a washing water source to a toilet bowl.

According to the washing water supply apparatus 1 of the invention, the valve member is directly opened/closed by a cam face of the cam. Therefore, operation of opening/closing the valve member can be made slow by devising a shape of the cam face. As the result, construction where operation of opening/closing the valve member does not become rapidly and water hammer phenomenon does not occur is obtained so as to prevent damage and the like caused by shock wave of each member.

As shown in FIG. 5, the cam face 8a of the first cam member 8 provides a valve pushing portion 8a-1 at a position of about 90 degrees from initial state (zero degree) to a forward direction (clockwise direction). A shape of cam face to the valve pushing portion 8a-1 near about 90 degrees from about 45 degrees position has a gentle slope not so steep. Under this construction, the above-mentioned water hammer phenomenon is hard to occur.

The cam face 9a of the first cam member 9 provides a valve pushing portion 9a-1 at a position of about 180 degrees from initial state (zero degree) to a forward direction (CW direction). A shape of cam face to the valve pushing portion 9a-1 near about 180 degrees from about 136 degrees position has a gentle slope not so steep. Because of such the construction, the above-mentioned water hammer phenomenon is hard to occur.

Figure 7:
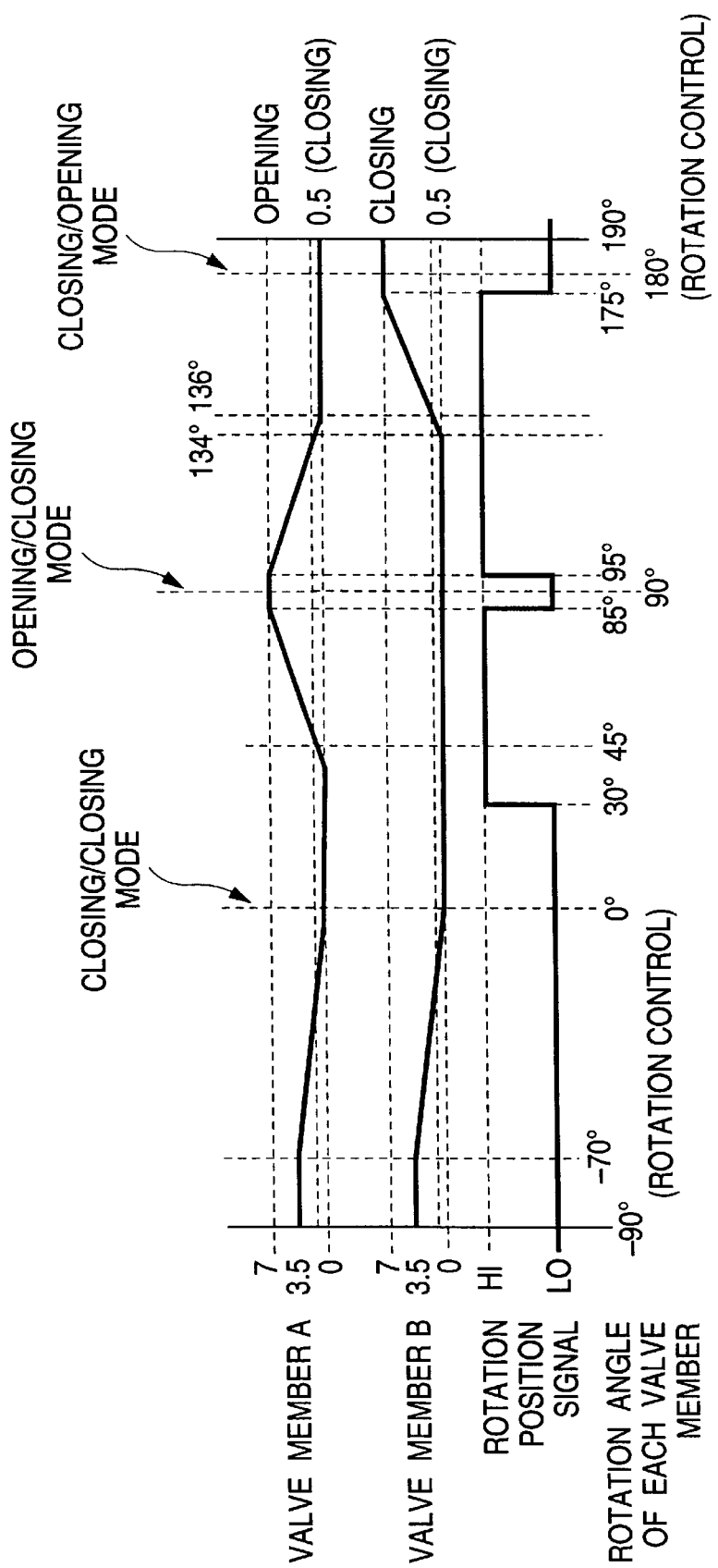
FIG. 7 is a graph showing a correlation of operation state of the both valve members, rotation angle of the cam member, and position signal of the washing water supply apparatus of FIG. 1.

As shown in FIG. 7, in the washing water supply apparatus 1 of the invention, rotation range of the above-mentioned operation shaft 5 rotating by drive force of the motor 2 is 180 degrees from the initial state (zero degree) to a forward direction (Clockwise direction). Although the maximum rotatable value is 190 degrees because of construction where a mechanic lock generates at rotation of 190 degrees, the rotation is controlled so as to be 180 degrees for the maximum rotation. In the washing water supply apparatus 1, the operation shaft 5 can be rotated 90 degrees, the maximum, from the initial state (zero degree) to a reverse direction (Counterclockwise direction) by manual.

Pushdown quantity of the valve member A acting by the cam face 8a of the first cam member 8 is 0 mm when the operation shaft 5 is initial state (0 degree). In this embodiment, both valve members A and B are controlled so that the cam face and the valve has a gap and full closed state at range of 0 mm to 0.5 mm of the pushdown quantity. The valve member A is gradually pushed from position where rotation of the operation shaft 5 exceeds 45 degrees to forward direction (CW direction) by the cam face 8a, and is full opened when the pushdown quantity is 7 mm of the maximum at rotation of 85 degrees. That is, at this time, the valve member A is pushed 6.5 mm by the above-mentioned valve pushing portion 8a-1 of the cam face 8a so that the opening full opens.

The valve member A is pushed out to the cam face 8a side of the first cam member 8. Therefore, when the closed state changes to the opened state by operating the cam member A against the pushing force, torque applied to the motor 2 is large. That is, torque applied to the motor 2 is large at a section from 45 degrees where the valve member A starts to open to 85 degrees where the valve member A full opens. In the present invention, during the section that the torque becomes in large, in order to deal with the large torque, the rotation speed for both cam members 8 and 9 by driving the motor becomes in slow.

The pushdown quantity of the valve member A starts to decrease gradually from position where rotation of the operation shaft 5 exceeds 95 degrees, and when the pushdown quantity at 134 degrees becomes 0.5 mm, the valve member A full closes. After that, the valve member A moves to the position of 0 mm of the pushdown quantity and keeps full closed state till the operation shaft 5 rotates 180 degrees.

Because the valve member A is pushed to the first cam member 8 side at changing to closed state from opened state, torque applying to the motor 2 is small. Therefore, in a section to 134 degrees where the valve member A full closes from 95 degrees, rotation drive speed of both cam members 8 and 9 by drive of the motor 2 is made high so as to shorten operation time using the small torque from opening to closing.

On the other hand, pushdown quantity of the valve member B acting by the cam face 9a of the second cam member 9 is 0 mm when the operation shaft 5 is initial state (zero degree) similarly as the valve member A. The valve member B keeps the state till rotation of the operation shaft 5 exceeds 136 degrees to forward direction (CW direction) from the initial state of the rotation of the operation shaft 5. The valve member B operates gradually to open to direction from the position exceeding 136 degrees, and at 175 degrees, the pushdown quantity becomes 7 mm of the maximum so that the opening full opens. After that, the valve member B keeps full opened state till 180 degrees.

The valve member B is pushed out to the cam face 9a side of the second cam member 9. Therefore, when the closed state changes to the opened state by operating the cam member B against the pushing force, torque applied to the motor 2 is large. That is, torque applied to the motor 2 is large at a section from 136 degrees where the valve member B starts to open to 175 degrees where the valve member B full opens. The mode for carrying out corresponds to the large torque by making rotation drive speed of the both cam members 8 and 9 by drive of the motor 2 slow.

As describe above, in the washing water supply apparatus 1 of the mode for carrying out, when the rotation is zero degree, the both valve members A and B are closed state; at 85 to 95 degrees, only the valve member A is full opened state; at 134 to 136 degrees, the both valve members A and B are closed state again; and at more than 175 degrees, only the valve member B is full opened state. That is, the washing water supply apparatus 1 of the mode for carrying out has plural opening/closing modes responding to rotation angles of the both cam members 8 and 9. Specifically, the apparatus have three modes: an opening/closing mode (state where the both valve members A and B are closed) at zero degree position; an opening/closing mode (state where the valve member A is opened and the valve member B is closed) at 90 degrees position; and an opening/closing mode (state where the valve members A is closed and the valve member B is opened) at zero degree position. At operation from opening/closing mode to closing/opening, rotation drive speed is made high at a part of the operation section (45 to 85 degrees and 95 to 134 degrees) so as to shorten the operation time over entire operation range.

In the washing water supply apparatus 1 of the mode for carrying out, there is not an instant when both are in opened state at changing operation of opened/closed state of the both valve members A and B, after the both are full closed once, the switching of opening/closing is carried out. Because of that, there is not an instant when both are in opened state and washing water is discharged at one stroke so as to save water.

The washing water supply apparatus 1 of the mode for carrying out has a construction in which opened/closed state of two valve members A and B is controlled by drive of the motor 2 and is carried out by manual. That is, the operation shaft 5 is possible to move to thrust direction by pulling the operation knob to XI direction shown with an arrow in FIG. 1. By the thrust moving, the operation shaft 5 can disengage the output gear 5a being the last stage of the reduction gear train at rotation direction so as to be possible to free against the motor 2. Therefore, it is possible to rotate the operation shaft 5 with manual independently on the motor drive by rotating the operation knob at disengaged state.

The washing water supply apparatus 1 of the mode for carrying out becomes normally opening mode as freeze proofing mode by rotating the operation shaft 5 about 70 degrees from the initial state (zero degree) to negative direction (CCW direction). In the mode for carrying out, the normally opening mode is formed so that the opening is always kept to open roughly half, and the both valve members A and B are pushed about 3.5 mm by the cam members 8 and 9. Because of such the construction, each opening/closing mode except the normal mode can come and go freely without through the normal mode positioned at −90 degrees so that each operation is efficiently carried out without through the normal mode at usual operation. The normal mode may be various kinds of suitable quantity in opening degree such as full opened, 80% opened, and so on not half opened. Additionally, changing operation of opening degree may be carried out by manual.

Next, operation of the washing water supply apparatus 1 of the mode for carrying out constructed as the above-mentioned at usual drive will be described below.

When electricity is turned on to the motor 2 at the initial state (zero degree) where the both valve members A and B are full closed state, drive force of the motor transfers the first gear 31 and the second gear 32, and the output gear 5a rotates with the operation shaft 5 and the drive shaft 52. At the rotation initial state, a rotation position signal outputted by the photo interrupter 15 is LO. When the operation shaft 5 and the drive shaft 52 rotate 30 degrees to forward direction (CW direction) from the initial state, the position signal changes to HI.

Further, the operation shaft 5 and the drive shaft 52 rotate to degree exceeding position of 45 degrees, the valve member A starts to be pushed down by the first cam member 8, opens gradually from closed state, and the valve member A full opens at a position of 85 degrees. On the other hand, while the operation, the valve member B side is not pushed down so as to keep closed state. Therefore, when exceeding the position of 85 degrees, the valve member A is full opened and the valve member B is full closed that is opening/closing mode. Because torque applied to the motor 2 is large at drive between 45 degrees and 85 degrees as describe above, the drive is carried out with low speed to obtain torque. The rotation position signal outputted by the photo interrupter 15 changes to LO from HI when exceeding 85 degrees. Thus, it is recognized to be opening/closing mode.

When drive of the motor 2 further goes forward from the above-mentioned opening/closing mode, the valve member A starts to be closed at exceeding 95 degrees of rotation position of the operation shaft 5 and the drive shaft 52. At the position exceeding 95 degrees, the rotation position signal changes to HI from LO and end of opening/closing mode is recognized. When the operation shaft 5 and the drive shaft 52 rotate to position of 134 degrees, pushdown quantity of the valve member A decreases to 0.5 mm so that the valve member A full opens. As described above, because torque applied to the motor 2 is small and it is needless to obtain torque at drive between 95 degrees and 134 degrees, drive is carried out with high speed. Thus, operation time while the operation is shortened, and entire series of operation time is shortened as the result.

Because the both valve members A and B are full closed while two degrees from 134 degrees to 136 degrees, there is not an instance when the both are opened. Because of that, washing water is not discharged to the toilet bowl at the same time from both openings closed by the both valve members A and B so that saving water is possible.

At exceeding 136 degrees, the valve member B in which full opened state has been kept till that time starts to open. At the rotation to 175 degrees, while the valve member B becomes full opened, the valve member A keeps closed state. Because of that, at position of more than 175 degrees, the valve member A is closed and the valve member B is opened, that is closing/opening mode. Similarly as the above-mentioned section from 45 degrees to 85 degrees, the drive between 136 degrees and 175 degrees is carried out with low speed to obtain torque because torque applied to the motor 2 is large. The rotation position signal outputted by the photo interrupter changes to LO from HI when exceeding 175 degrees. Thus, it is recognized to be opening/closing mode.

As describe above, after the operation shaft 5 and the drive shaft 52 are rotated 180 degrees from the rotation initial position (zero degree), and closing/closing mode, opening/closing mode, and closing/opening mode are switched in order, the motor 2 is switched to reverse direction rotation. Thus, this time, closing/opening mode changes to opening/closing mode, and finally changes to closing/closing mode so as to end a series of operations. Rotation drive speed is reversely made high at sections (45 to 85 degrees and 136 to 175 degrees) made low at forward direction (CW direction) rotation, and is reversely made low at section (95 to 35 degrees) made high at forward direction (CW direction) rotation. Thus, operation time of return operation is shortened.

Although flow of a series of operations at usual operation is described above, the operations are for large wash, and for small wash, only the valve member A may be opened at a series of operations by returning to the initial position reversely after rotating to 90 degrees.

Although the above-mentioned mode for carrying out is an suitable example of the mode for carrying out of the invention, the invention is not limited to this, so various variations is possible to carrying out in the scope without departing from the substance of the invention. For example, although rotation drive speed at moving between each opening/closing mode is changeable to shorten the entire operation time in the above-mentioned washing water supply apparatus of the mode for carrying out, the rotation drive speed of the operation shaft 5 may be always constant.

Although normally opening mode is provide at another position than usual operation mode to carry out usual operation without through normal mode in the above-mentioned mode for carrying out, a passing-trough position may be provide at a series of operation without providing the normal mode at the another position. Although each of valve members A and B is opened by pushing down the valve members A and B with each of cam members 8 and 9 in the above-mentioned mode for carrying out, each of valve members A and B may be closed using pushing-down operation.

The both valve members A and B are closed once in order that the both valve members A and B are opened at the position 134 to 136 degrees of rotation angle of the operation shaft 5 in the above-mentioned mode for carrying out, while one valve member is closed, the other valve member may be opened. In this case, at the same time when pushing-down operation is carried out with the cam face of one cam member, the valve member is pushed back with the cam face of the other cam member. Because of that, drive torque is cancelled at the operation section so as to avoid increase of drive torque of the motor caused of pushing-down operation. Therefore, rotation drive speed at the section can be made high so as to further shorten the entire operation time.

As described above, according to the washing water supply apparatus of the invention, the cam member is driven rotatably by the drive source, and the valve members opening/closing the opening leading to the toilet from washing water source are directly opened/closed by the cam members. Therefore, degree of opening of the valve member can be controlled. Further, since change to closing from opening is gradually carried out not in an instant such as the conventional electromagnetic valve system, so-called water hammer phenomenon does not occur so that damage of the valve member, the pipe, and etc. is hard to occur. By varying rotation drive speed of the cam member responding to operation condition, it is possible to shorten operation time of a series of operations so as to shorten the entire operation time.

What is claimed is:

1. A washing water supply apparatus for supplying washing water to a toilet comprising:
   a plurality of valve members for opening/closing a plurality of openings leading to said toilet from a washing water source, each of said valve members corresponding to each of said openings, respectively;
   a cam member for opening/closing each of the valve members directly;
   a driving source for driving the cam member rotatably; and
   a plurality of opening/closing modes for each of said valve members,
   wherein a cam face shape of each of said cam members operating each of said valve members to open/close each of said openings is constructed so that two of said openings are prevented from opening simultaneously.

2. A washing water supply apparatus according to claim 1, wherein rotation drive speed of said cam member at operating said valve member to opening from closing is lower than a predetermined speed and rotation drive speed of said cam member at operating said valve member to closing from opening is higher than the predetermined speed, wherein said respective valve member is urged against the cam surface for changing from an opened to a closed state.

3. A washing water supply apparatus for supplying washing water to a toilet comprising:
   valve members for, respectively opening/closing a plurality of openings leading to said toilet from a washing water source;
   a cam member opening/closing a respective one of each of said valve members directly; and
   a driving source driving the cam member rotatably,
   wherein a plurality of opening/closing modes respond to a rotation angle of said cam member and the plurality of opening/closing modes include a normal mode keeping state wherein said openings leading to said toilet open at the same time, and said normal mode is provided in a separate position from the other of said plurality of opening/closing modes,
   wherein said cam member is driven rotatably in both directions and move between each opening/closing mode without going through said normal mode.

4. A washing water supply apparatus according to claim 3, wherein rotation drive speed of said cam member is changeable responding to the operation state.

5. A washing water supply apparatus according to claim 3, wherein a plural of said openings are provided, said valve members are provided so as to correspond to these openings, plural opening/closing modes of these plural valve members are formed, and rotation drive speed of said cam members in each opening/closing mode section are different at least in a part of the modes.

6. A washing water supply apparatus according to claim 5, wherein plural cam members different in cam face shape responding to said plural valve members are provided, and cam face shapes of said plural cam members are arranged in such a manner that a position where a rotational load during one cycle of one cam member becomes in maximum is matched with a position where a rotational load during one cycle of the other cam member becomes in minimum.

7. A washing water supply apparatus according to claim 5, wherein the cam face shape of said cam member operating said each valve member opening/closing said each opening is constructed to avoid the condition said plural openings open at the same time.

* * * * *